United States Patent
Gaubil et al.

(10) Patent No.: US 6,576,580 B2
(45) Date of Patent: Jun. 10, 2003

(54) FUSED CAST PRODUCTS BASED ON ALUMINA-ZIRCONIA-SILICA WITH AN IMPROVED MICROSTRUCTURE

(75) Inventors: Michel Marc Gaubil, Avignon (FR); Yves Marcel Léon Boussant-Roux, Avignon (FR); Emmanuel Jean-Marie Sertain, Paris (FR); Alain Paul Bernard Zanoli, Avignon (FR)

(73) Assignee: Societe Europeenne des Produits Refractaires, Courbevoie (FR)

( * ) Notice: Subject to any disclaimer, the term of this patent is extended or adjusted under 35 U.S.C. 154(b) by 55 days.

(21) Appl. No.: 09/771,588

(22) Filed: Jan. 30, 2001

(65) Prior Publication Data

US 2001/0019992 A1 Sep. 6, 2001

(30) Foreign Application Priority Data

Jan. 31, 2000 (FR) ............................................. 00 01192

(51) Int. Cl.⁷ ............................................. C04B 35/488

(52) U.S. Cl. ....................................... 501/105; 501/104

(58) Field of Search ................................ 501/103, 105, 501/104

(56) References Cited

U.S. PATENT DOCUMENTS

| | | | |
|---|---|---|---|
| 2,438,552 A | | 3/1948 | Field |
| 4,119,472 A | * | 10/1978 | Brashear, Jr. et al. ........ 501/105 |
| 4,791,077 A | * | 12/1988 | Kim et al. .................. 501/105 |
| 4,910,174 A | * | 3/1990 | Bert et al. .................. 501/105 |
| 5,028,572 A | * | 7/1991 | Kim et al. .................. 501/103 |
| 5,171,491 A | * | 12/1992 | Kim et al. ..................... 264/25 |

FOREIGN PATENT DOCUMENTS

| | | |
|---|---|---|
| EP | 0 235 909 | 9/1987 |
| FR | 2 363 535 | 3/1978 |

* cited by examiner

*Primary Examiner*—Karl Group
(74) *Attorney, Agent, or Firm*—Young & Thompson (57) ABSTRACT

Oxidized alumina-zirconia-silica (AZS) refractories containing 40 wt % to 55 wt % $Al_2O_3$, 32 wt % to 45 wt % $ZrO_2$, 10 wt % to less than 16 wt % $SiO_2$ and 1 wt % to 3 wt % of an alkali metal oxide selected from $Na_2O$, $K_2O$ and mixtures thereof have a microstructure essentially comprising alpha-alumina crystals, free zirconia crystals, eutectic crystals and an intercrystalline vitreous phase. At least in an active area, more than 20% by number of the free zirconia crystals have a dendritic shape and are interleaved with each other and with eutectic crystals and at least 40% by number of the dendritic free zirconia crystals have a dimension greater than 300 $\mu$m.

6 Claims, 4 Drawing Sheets

◆ PRODUCTS OUTSIDE OF THE INVENTION   ■ PRODUCTS OF THE INVENTION

\* OUTSIDE OF THE INVENTION

* OUTSIDE OF THE INVENTION

\* OUTSIDE OF THE INVENTION

FUSED CAST PRODUCTS BASED ON ALUMINA-ZIRCONIA-SILICA WITH AN IMPROVED MICROSTRUCTURE

BACKGROUND OF THE INVENTION

1. Field of the Invention

The invention relates to AZS (alumina-zirconia-silica) fused cast products having improved characteristics for use in a glass melting furnace. The invention relates more particularly to oxidized AZS products characterized by a homogeneous crystal structure and having elongate dendritic zirconia crystals in the active area thereof. The simultaneous presence of these characteristics provides these products with increased resistance to corrosion by molten glass.

2. Description of the Prior Art

Fused cast products (also referred to as "electro-cast" products) are obtained by melting a mixture of appropriate raw materials in an electric arc furnace or by any other melting technique suited to the products concerned. The molten liquid is then cast in a mold to produce shaped components directly. The product is generally then subjected to a controlled cooling program to cool it to ambient temperature without it breaking. The skilled person refers to this operation as "annealing".

AZS products have been known in the art for a number of decades and have supplanted products based only on alumina and silica. U.S. Pat. Nos. 2,271,366 and 2,438,552 describe the first improvements to AZS products. FR-A-1 208 577 teaches the production of AZS products under oxidizing conditions. The first generation products tended to release gas bubbles into the molten glass, leading to unacceptable defects in the glass. Changing to oxidizing production conditions improved the strength of the AZS products and the quality of the glass. Oxidized products are generally white-yellow to white-orange in color, whereas reduced products are white to white-gray in color.

AZS refractory products comprise different phases: alpha-alumina crystals (corundum), zirconia crystals and a vitreous phase. The alpha-alumina and the zirconia are partly combined in eutectic crystals.

The prior art provides sometimes contradictory teaching as to the nature and the shape of the crystals. U.S. Pat. No. 2,079,101 indicates that it is preferable to have a highly oriented crystal structure in which the crystals are parallel to each other and perpendicular to the faces of the cast block. FR-A-1 153 488 describes AZS products with an interleaved crystal structure which is advantageous in terms of improved corrosion resistance. The above products are first generation products, i.e. reduced products. However, the inventors of FR-A-1 153 488 disclose their invention only in relation to a very particular block shape and their microstructure analyses relate to only a small area of the block. They indicate that it is the chemical composition of the product that produces the required microstructures. In particular, they specify that the crystal structure of their invention is encountered only in a small area of the $Al_2O_3$-$ZrO_2$-$SiO_2$ system in which the silica content is from 16% to 20%. They also indicate that the presence of too high a proportion of sodium oxide has a harmful effect on corrosion resistance and that the $Na_2O$/$SiO_2$ ratio must be limited to 0.14. U.S. Pat. Nos. 4,791,077 and 5,171,491 indicate that there is a structural difference between the skin and the core of the components. They also teach that a structure with elongate and interleaved crystals is disadvantageous and propose a solution for obtaining components with a fine and uniform microstructure free from dendritic zirconia crystals.

The products commercially available at present are oxidized products, such as our ER-1681, ER-1685 and ER-1711 products, which respectively contain 32%, 36% and 40% by weight of zirconia on average.

The above products contain zirconia which is referred to as "free" or "primary" zirconia (because it is not included in the eutectic crystals). The free zirconia crystals are small and tend to assume a spherical or nodular shape. Eutectic corundum zirconia crystals are also encountered. They have a relatively isotropic shape. Free corundum crystals are often encountered in the products commercially available at present.

AZS refractories are widely used in glass furnaces, in areas in contact with the molten glass. Some new glass compositions are more corrosive with respect to the materials of which the furnace is constructed. Also, glassmakers are seeking much longer working periods (determined by the service life of the refractories). There is therefore still a need for refractories that are more resistant to corrosion by molten glass. The most sensitive area is at the flotation line. The service life of the furnace is often dependent on the wear of the materials at the flotation line. Also, changes in glass-making furnace design have increased the loads imposed on the hearth of the furnace. Increased insulation of the hearth to limit the consumption of the furnace, the use of bubblers and the increasing number of electrodes passing through the hearth have led to an increase in the temperature of the hearth where it is in contact with the molten glass, which exacerbates the problems of corrosion. There is therefore a need for products having improved corrosion resistance. It is well known in the art that introducing large quantities of zirconia improves corrosion resistance. However, increasing the zirconia content increases the cost and leads to increased segregation in the product, which can reduce industrial feasibility. Also, the increased zirconia content reduces the thermal conductivity, which is disadvantageous from the point of view of the industrial corrosion rate. The rate of corrosion of a material depends on the glass/refractory interface temperature, which is in turn conditioned by the thermal conductivity of the refractory. The more insulative the refractory product and the higher its interface temperature, the greater its rate of corrosion.

There is therefore a requirement for an AZS refractory having improved corrosion resistance with no significant increase in zirconia content.

An object of the invention is to satisfy that requirement.

In-depth studies have shown that it is possible to obtain an oxidized AZS refractory with increased corrosion resistance with the same chemical composition as typically encountered nowadays, the material being characterized by a novel and improved microstructure in the active area.

SUMMARY OF THE INVENTION

The invention provides oxidized alumina-zirconia-silica (AZS) refractories containing 40 wt % to 55 wt % $Al_2O_3$, 32 wt % to 45 wt % $ZrO_2$, 10 wt % to less than 16 wt % $SiO_2$ and 1 wt % to 3 wt % of an alkali metal oxide selected from $Na_2O$, $K_2O$ and mixtures thereof, having a microstructure essentially comprising alpha-alumina crystals, free zirconia crystals, eutectic crystals and an intercrystalline vitreous phase, wherein, at least in the active area, more than 20% by number of the free zirconia crystals have a dendritic shape and are interleaved with each other and with eutectic crystals and at least 40% by number of the dendritic free zirconia crystals have a dimension greater than 300 $\mu$m.

A surface area of 64 mm² of the active area of the materials preferably contains at least 200 dendritic free zirconia crystals having a dimension greater than 300 μm.

The materials claimed preferably contain 45 wt % to 50 wt % $Al_2O_3$, 34 wt % to 38 wt % $ZrO_2$, 12 wt % to 15 wt % $SiO_2$ and 1 wt % to 3 wt % of an alkali metal oxide selected from $Na_2O$, $K_2O$ and mixtures thereof.

For cost reasons, the alkali metal oxide is preferably $Na_2O$.

More than 20% of the dendritic free zirconia crystals are preferably longer than 500 μm.

A surface area of 64 mm² of the active area of the materials preferably contains at least 100 dendritic free zirconia crystals having a dimension greater than 500 μm.

Surprisingly, it has been shown that it is possible to obtain microstructures offering improved corrosion resistance in a reproducible and homogeneous manner in the active area for a given range of chemical composition and using the oxidizing production method. Trials have been conducted and show also that if the microstructure of the AZS materials contains free zirconia crystals at least 20% of which by number have a dendritic shape and at least 40% of which by number have a dimension greater than 300 μm, corrosion resistance is improved by more than 15% relative to equivalent materials that do not satisfy this condition. Below the above thresholds, and in particular below the minimum dimension of 300 μm, no significant improvement in corrosion resistance is observed, even if the total number of free zirconia crystals is large.

It has been noted that, in the case of products in accordance with the invention, almost all (at least 80%) of the free zirconia crystals more than 300 μm long are dendritic free zirconia crystals.

A value of 300 μm has been adopted as a critical limit for the length of the dendritic free zirconia crystals. Analysis of the microstructures of a conventional AZS product used as a reference product showed that the average length of the free zirconia crystals was less than 100 μm and that the longest crystals were 250 μm long. The presence of elongate crystals longer than 300 μm is therefore the sign of a reinforcing. The reinforcing is significant when more than 40% by number of the dendritic free zirconia crystals satisfy this minimum length criterion.

To understand the role of these crystals in the mechanism of corrosion of AZS products it is necessary to review the various steps of the process of dissolution of the material in contact with molten glass. The phenomenon begins with the penetration of corrosive alkaline elements of the molten glass into the vitreous phase of the material. This is followed by the onset of dissolution of the alumina of the eutectic in the vitreous phase, behind the glass/refractory interface. An interface layer rich in alumina is finally created, which contains the zirconia skeleton of the material. This interface layer is very important because it protects the material. The renewal of this interface by the convection of the molten glass aggravates corrosion of the refractory. It is considered that the presence of zirconia crystals of sufficient size (greater than the dimension of the interface) and the interleaving of those crystals constitutes a reinforcement of the interface layer limiting its renewal. Reducing renewal in this way slows the process of corrosion of AZS refractories. The interleaving of the crystals, which has an important function, is possible only if the crystals concerned are of sufficiently elongate shape. Accordingly, only dendritic free zirconia crystals are taken into account.

The specified limits for the contents of $Al_2O_3$, $ZrO_2$ and $SiO_2$ encompass the compositions of existing conventional commercial materials. The presence of silica is necessary to guarantee industrial feasibility but must be maintained at a level less than 16% because, beyond that value, there is massive penetration in service of corrosive elements of the glass and disintegration of the material caused by strong convection currents encountered in the heaviest wear areas of modern glass-melting furnaces.

To prevent the formation of mullite and thereby encourage the formation of an intercrystalline vitreous phase rich in silica the total content of sodium oxide and/or potassium oxide must not be less than 1%. The plasticity of this amorphous phase accommodates mechanical stresses associated with cooling of the material and the change in volume associated with the allotropic transformation of the zirconia over a wide range of temperatures. These conditions ensure that the parts are industrially feasible. In contrast, to prevent problems of exudation and reduced corrosion resistance the total content of sodium oxide and/or potassium oxide must not exceed 3%.

The following description, which refers to the accompanying graph and microphotographs, clearly explains the invention and the advantages of the novel products. The examples are provided in order to illustrate the invention and are not limiting on the invention.

BRIEF DESCRIPTION OF THE DRAWINGS

FIG. 1 is a diagrammatic view of a block identifying the various faces and dimensions referred to in the following description.

FIG. 2 is a graph of the corrosion resistance index as a function of the percentage of zirconia.

FIGS. 3 and 4 are microphotographs showing the free zirconia phase of different products.

DETAILED DESCRIPTION OF THE PREFERRED EMBODIMENTS

FIG. 1 shows a refractory block 1 of height h, width l and thickness e. The block has a cast face 2, a bottom 3 and a face 4 intended to be in contact with molten glass.

For purposes of evaluation, several blocks and slabs were made by the fusion method described in French patent No. 1 208 577. A Héroult electric arc melting furnace was used having two electrodes and a crucible approximately 1 m in diameter and able to contain approximately 200 kg of liquid.

Reference conventional products were made using a voltage of 250 V to 300 V, a current of 1300 A to 1400 A and an energy input of 2000 kWh to 2500 kWh per metric ton.

Products in accordance with the invention were made using a voltage of 250 V to 300 V, a current of 1500 A to 1600 A and an energy input in excess of 3000 kWh per metric ton.

The skilled person is well aware that the above parameters define the production conditions perfectly.

The raw materials used were more than 98% pure; in particular our CC10 zirconia, alumina, sodium carbonate and zircon sand were used.

The various tests and measurements described hereinafter were carried out to study the behavior of the various components made.

A sample was taken to characterize each part. The sample has to be representative of the active area. The expression "active area" refers to the most heavily loaded area, in which the corrosion resistance is to be increased. it can be defined as a function of the use of the part. For a slab (less than 150 mm thick)positioned at the bottom of the tank and in contact with the molten glass, for example, the active area is the whole of the slab, on condition that the height is less than or equal to the width of the slab. For a palisade block the active area corresponds to that part of the block situated at the flotation line. In practice, the active area is regarded as the whole of the volume for which the height is less than 200 mm from the bottom of the block. The flotation line is typically 100 mm from the bottom of the block. In order to be representative, the samples studied (by chemical composition, microstructure and corrosion testing) were therefore taken from the bottom in the case of slabs and 100 mm from the bottom in the case of palisade blocks, i.e. at the level of the flotation line under industrial conditions of use, or from the bottom of the block. The sample was taken perpendicularly to the bottom, which is the face opposite the cast face.

It is important first of all to define the level of oxidation of the products studied. This can be determined by means of an exudation test. The test is performed on a pellet of the product sampled parallel to the bottom face of the block or slab. To be valid, the test must be carried out on a pellet whose porosity is less than 3%. The pellet is heated to 1600° C. for 15 hours. Measuring the volume of the pellet before and after the test determines the volume of the vitreous phase exuded by the material. That volume depends on the level of oxidation of the material. Insufficient oxidation leads to the presence of a large quantity of dissolved gas in the vitreous phase, to a reduced viscosity of the vitreous phase and to an under-oxidation of impurities (for example iron), which are then found in the form of metal nodules in the vitreous phase. During heating and/or contact with the glass during the test, ex-solution of the gases dissolved in the vitreous phase and reactions of oxidation of impurities present in the vitreous phase are observed. These phenomena and the reduced viscosity of the vitreous phase encourage expulsion of the vitreous phase. Thus, the level of oxidation of the materials is related to the rate of exudation. If the increase in volume is less than 3% the product is said to be oxidized. All the products referred to herein by way of example (those in accordance with the invention and reference products) are oxidized products.

The corrosion test used was the static test known as the "small rotary furnace" test described by J. RECASENS, A. SEVIN and M. GARDIOL at the 8th International Glassmaking Congress held in London from Jul. 1 to 6, 1968. Twelve samples were cut in the shape of keystones (height 100 mm, average thickness 45 mm) to construct the wall of a small circular shaft. The resulting shaft contained molten glass and was rotated. The test was conducted with soda-lime glass at 1550° C. for 3 weeks. The depth of attack at the glass level was measured to assign a corrosion resistance index.

The microstructures of the AZS products were analyzed and characterized using a JXA-880 R/RL (JEOL) electronic microprobe and an image analysis software. The microprobe produced digital images with different gray levels corresponding to the concentration of the various elements: Al, Zr, Si, etc. The image analysis software deduced from these the various phases present and their respective percentage; the standard deviation of the measurement was less than 0.5%. The free zirconia appeared to be the phase having great influence on the corrosion resistance as a function of the appearance of the crystals that constitute it. There are two very different shapes of free zirconia crystals. With the dendritic shape, the free zirconia crystal appears long and tapered. One dimension of the crystal is then much greater than the other. In particular, the form factor (the ratio L/I between the greatest and smallest dimensions of the crystal) must be greater than 5 for the shape to be dendritic. In contrast, for a nodular or non-dendritic shape, the free zirconia crystal takes the form of nodules, and the various dimensions of the crystal are then relatively similar. It therefore appears that the greatest dimension of the free zirconia crystal is an important characteristic and must be evaluated. To this end, the software recognized free zirconia crystals and determined various parameters of the crystals (L, I, form factor, etc). Dendritic free zirconia crystals are free zirconia crystals having an L/I ratio greater than 5, where L is the length of the free zirconia crystal.

The main characteristics of the products studied are set out in table 1.

The chemical analysis as a weight percentage, the complement being alumina, was determined by X-ray fluorescence. The analyses given are those of samples taken as indicated above. The skilled person will be aware that the proportion of zirconia tends to be greater at the bottom of the block because of segregation in the block. The characteristics of the microstructure were evaluated over an area of 64 $mm^2$ to the rear of the saber cut area (level of the free surface of the glass).

All zirconia crystals whose surface area is greater than 640 $\mu m^2$ were regarded as free zirconia crystals. Zirconia crystals with a surface area less than 640 $\mu m^2$ were encountered only at the edges of the eutectic areas. They were very few in number and had no major influence. The characteristics of the microstructures given in table 1 relate only to free zirconia crystals. T is the total number of free zirconia crystals counted over the area

TABLE 1

| Reference | Type | Chemical analysis (%) | | | Microstructure | | | | | | |
| | | $ZrO_2$ | $SiO_2$ | $Na_2O$ | T | D | D/T | D300 | D300/D | D500 | D550/D | Ic |
| --- | --- | --- | --- | --- | --- | --- | --- | --- | --- | --- | --- | --- |
| 282-2* | Slab | 32.8 | 14.1 | 1.27 | 1690 | 70 | 4.1% | 0 | 0.0% | 0 | 0.0% | 100 |
| 275-2* | Block | 32.9 | 15.3 | 1.28 | 2194 | 119 | 5.4% | 4 | 3.4% | 0 | 0.0% | 100 |
| 275-5 | Block | 33.2 | 15.2 | 1.26 | 138 | 28 | 20.3% | 12 | 42.9% | 4 | 14.3% | 113 |
| 282-8 | Slab | 34.7 | 13.7 | 1.52 | 288 | 187 | 64.9% | 139 | 74.3% | 88 | 47.1% | 123 |
| 289-2* | Block | 34.9 | 13.2 | 1.98 | 1250 | 115 | 9.2% | 1 | 0.9% | 0 | 0.0% | 100 |
| 275-8 | Block | 35.9 | 15.2 | 2.23 | 1943 | 494 | 25.4% | 257 | 52.0% | 144 | 29.1% | 130 |
| 282-5 | Slab | 36.0 | 14.0 | 1.56 | 1058 | 379 | 35.8% | 244 | 64.4% | 127 | 33.5% | 120 |
| 290-8 | Block | 38.4 | 12.3 | 2.10 | 1568 | 405 | 25.8% | 268 | 66.2% | 155 | 38.3% | 126 |
| 290-2* | Block | 38.7 | 13.7 | 1.96 | 4495 | 143 | 3.2% | 34 | 23.8% | 8 | 5.6% | 109 |
| 289-11 | Block | 40.2 | 11.8 | 2.14 | 1435 | 578 | 40.3% | 319 | 55.2% | 140 | 24.2% | 147 |
| 290-5* | Block | 40.9 | 12.6 | 1.94 | 3381 | 130 | 3.8% | 51 | 39.2% | 15 | 11.5% | 113 |

TABLE 1-continued

| Reference | Type | Chemical analysis (%) | | | Microstructure | | | | | | | |
|---|---|---|---|---|---|---|---|---|---|---|---|---|
| | | ZrO$_2$ | SiO$_2$ | Na$_2$O | T | D | D/T | D300 | D300/D | D500 | D550/D | Ic |
| 289-10 | Block | 41.7 | 11.8 | 2.08 | 1850 | 417 | 22.5% | 289 | 69.3% | 143 | 34.3% | 148 |
| 290-11 | Block | 43.0 | 12.1 | 1.96 | 3079 | 703 | 22.8% | 338 | 48.1% | 167 | 23.8% | 134 |
| 289-9 | Block | 43.2 | 10.9 | 2.19 | 1427 | 488 | 34.2% | 333 | 68.2% | 203 | 41.6% | 145 |
| 289-5* | Block | 49.3 | 9.8 | 1.90 | 4351 | 94 | 2.2% | 7 | 7.4% | 2 | 2.1% | 144 |

*Products not in accordance with the invention studied. D is the total number of dendritic free zirconia crystals, for which L/I is therefore greater than 5. D300 is the number of dendritic free zirconia crystals longer than 300 μm. D500 is the number of dendritic free zirconia crystals longer than 500 μm. Ic is the corrosion index; the index 100 is that of the reference product, which was our ER-1681 product.

Figure 5:
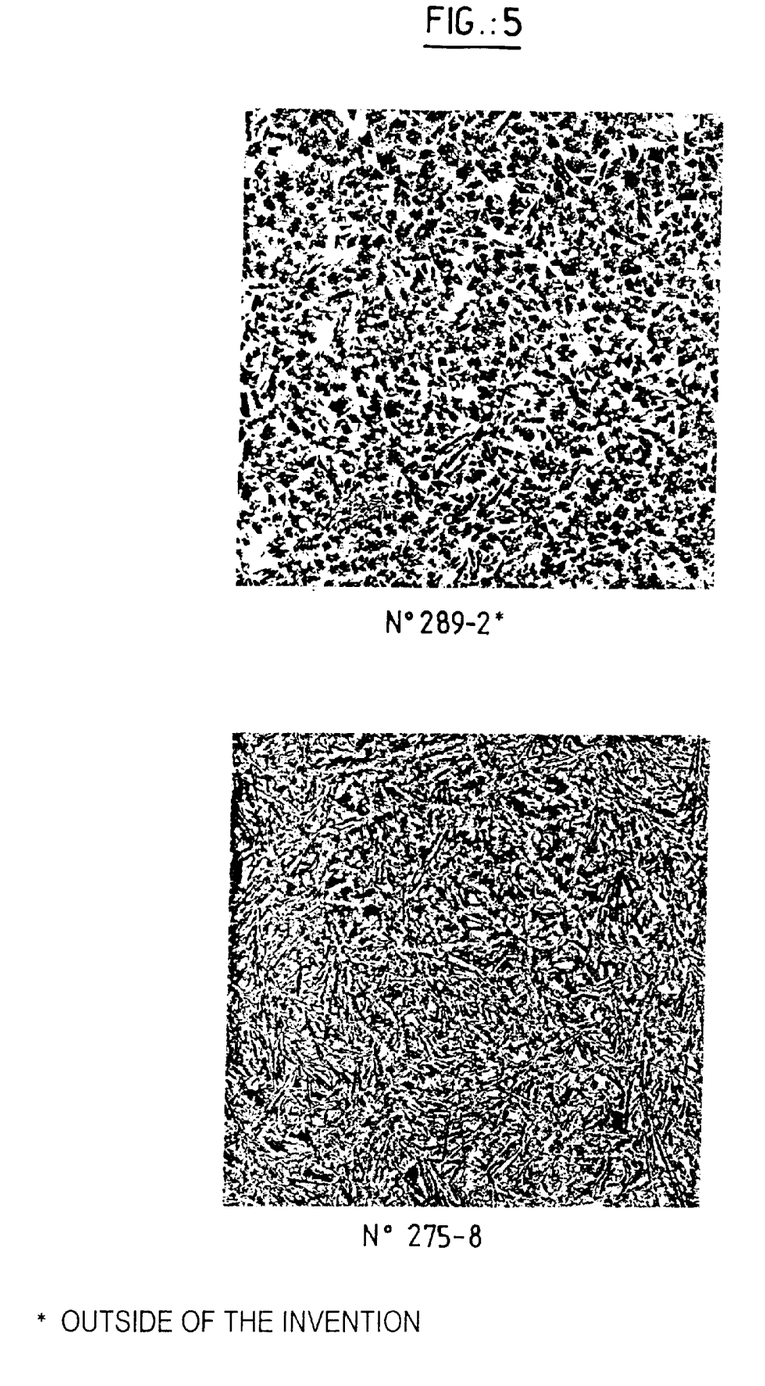
FIG. 5 comprises two microphotographs showing the eutectic phase of two products.

Eutectic crystals of the materials according to the invention had different morphological characteristics to the reference products. The FIG. 5 microphotographs show that the appearance of eutectic crystals is close to that of free zirconia crystals. One dimension of these crystals is generally very much greater than the other, which gives an elongate appearance.

The values of the corrosion resistance indices and the FIG. 2 graph show clearly the general tendency of the materials in accordance with the invention of having an improved corrosion resistance. This representation also highlights the logical tendency for corrosion resistance to improve as the zirconia content increases. However, it is seen that, for equivalent zirconia contents, products in accordance with the invention provide an improvement of 15% to 30% in the corrosion resistance index. This also means that products less rich in zirconia, and therefore less costly, can be used to achieve a given level of corrosion resistance.

From the point of view of the microstructure, it is seen that the total number of free zirconia crystals, partly related to the zirconia content of the product, is not a good indicator for evaluating corrosion resistance. It can be seen that some materials have a very large number of free zirconia crystals without this achieving any improvement in corrosion resistance. Conversely, some materials in accordance with the invention have a relatively small number of free zirconia crystals but nevertheless have a corrosion resistance index significantly higher than the equivalent standard products.

Without seeking to tie the invention to any particular theory, it is thought that it is above all the shape, and in particular the length, of the crystals that has an important influence on the performance of the materials. If the crystals are small and of nodular shape they do not contribute to reinforcing the microstructure and all that is observed is the effect of the zirconia content, which is known to provide particularly good corrosion resistance. In contrast, when the crystals have an elongate shape and their length becomes sufficiently great, they assume an arrangement in which they are interleaved with each other and with the eutectic crystals, which reinforces the material and improves the resistance to corrosion by molten glass.

The study showed that in the conventional materials very few crystals were of elongate shape (dendritic free zirconia crystals) and that the average length of the zirconia crystals did not exceed 100 μm to 200 μm. Even if the zirconia content of the product was increased, dendritic free zirconia crystals longer than 300 μm represented only a small proportion of the material. Conversely, in materials in accordance with the invention a sufficient number of elongate crystals was observed that were sufficiently long to be interleaved. FIGS. 3 and 4 and the comparative microphotographs of the products 289-2* and 275-8 or 290-5* and 289-11 and 289-10 or 289-5* and 289-9 clearly show the microstructure differences.

To observe a significant improvement in corrosion resistance without increasing the zirconia content, it is estimated that the number of dendritic free zirconia crystals must be greater than 20% relative to the total number of free zirconia crystals and that at least 40% of the dendritic free zirconia crystals must have a length greater than 300 μm.

To obtain materials in accordance with the invention it is necessary to comply with a number of criteria relating to the melting, casting and annealing steps.

In particular, it is important to maintain a level of oxidation comparable with the reference products. This can be achieved by adopting the so-called "long electric arc" working conditions in which contact between the liquid and the graphite electrodes is minimized and of very short duration.

It is also important to encourage the zirconia crystal growth phase. To obtain this result it is necessary to operate on several parameters.

A) First of all, the production cycle must enable total and perfect melting of the raw materials in order to prevent the presence within the liquid of numerous solid particles encouraging the nucleation phase, which would increase the number of zirconia crystals and would therefore limit their growth.

B) It is also necessary to encourage the zirconia crystal growth phase. To achieve this it is necessary to prevent excessively fast cooling of the liquid on casting. To this end the casting rate is very much greater than those conventionally used.

C) Finally, it is important to increase the thermal gradients within the block or the slab during the first moments of solidification. This can be achieved by increasing the quenching characteristics of the mold (by using a water-cooled mold for example).

It is important to note that the conditions for obtaining microcrystalline structures of materials in accordance with the invention are more difficult to obtain under oxidizing production conditions than under reducing conditions.

As a matter of fact, reduced products are produced either through direct contact of the electrodes with the bath of molten oxides or by creating a very short arc between the electrodes and the bath. These production conditions encourage a homogeneous molten bath (there are strong convection currents in the vicinity of the electrodes) and fewer solid particles are seen. It is also possible for the reduced liquids to be more aggressive in relation to these undissolved particles.

It has been verified, moreover, that the characteristics of the micrbstructures of products in accordance with the invention are in fact similar at different points in the active area thereof.

The study was conducted on a block in accordance with the invention; samples were taken at four points combining two heights, namely 50 mm and 150 mm (i.e. 50 mm to each side of the flotation line) and two thicknesses in the depthwise direction in the block, namely 30 mm and 70 mm. The parameters of the microstructures observed were compared with those of a sample taken at the flotation line (sample A).

The results are given in table 2:

TABLE 2

| Sample | A | 50.30 | 50.70 | 150.30 | 150.70 |
|---|---|---|---|---|---|
| T | 1395 | 1305 | 1497 | 1067 | 1234 |
| D | 455 | 438 | 521 | 316 | 381 |
| D/T | 32.6% | 33.6% | 34.8% | 29.6% | 30.9% |
| D300 | 280 | 266 | 296 | 200 | 226 |
| D300/D | 61.5% | 60.7% | 56.8% | 63.3% | 59.3% |

The above results show that the microstructure criteria for products in accordance with the invention are satisfied throughout the active area of the parts studied.

Materials in accordance with the invention can optionally contain other oxides in addition to the main oxides mentioned above.

Accordingly, under production conditions as described above for products in accordance with the invention, a series of blocks was made each containing one of the following optional oxides: $B_2O_3$ (0.4% to 2.0%), BaO (0.4% to 3.8%), $Cr_2O_3$ (0.4% to 5.0%), $Li_2O$ (0.4% to 1.3%) and MgO (0.4% to 1.0%), all the above proportions being percentages by weight relative to the total composition. Mixtures of optional oxides can also be used, provided that the total amount of optional oxides does not exceed 5% by weight.

Qualitative observation of the microstructure of the products using an optical microscope showed that the optional oxides did not prevent the obtaining of a microstructure containing a sufficient number of dendritic zirconia crystals longer than 300 μm.

Table 3 below sets out examples of chemical analyses of materials in accordance with the invention containing $K_2O$ or one of the optional oxides mentioned above. The proportion of $Al_2O_3$ (not indicated) corresponded to the difference between 100% and the total for the constituents indicated.

TABLE 3

| Reference | $ZrO_2$ | $SiO_2$ | $Na_2O$ | $K_2O$ | $B_2O_3$ | BaO | $Cr_2O_3$ | $Li_2O$ | MgO |
|---|---|---|---|---|---|---|---|---|---|
| 6525-5 | 35.1 | 13.5 | 1.33 | 0.47 | | | | | |
| 6428-1 | 34.1 | 15.0 | 0.71 | 1.60 | | | | | |
| 6428-2 | 34.2 | 14.8 | 0.60 | 1.91 | | | | | |
| 6428-4 | 34.3 | 14.7 | 0.49 | 2.22 | | | | | |
| 6422-2 | 34.3 | 14.7 | 1.13 | | 0.54 | | | | |
| 6371-6 | 37.0 | 13.9 | 1.08 | | 1.80 | | | | |
| 6417-2 | 33.6 | 14.3 | 1.07 | | | 1.50 | | | |
| 6632-1 | 35.4 | 13.0 | 1.38 | | | 1.18 | | | |
| 6417-1 | 34.3 | 14.4 | 1.06 | | | 2.20 | | | |
| 6632-4 | 34.8 | 12.8 | 1.22 | | | 2.83 | | | |
| 6277-1 | 33.1 | 15.1 | 1.38 | | | | 1.35 | | |
| 6651-2 | 33.6 | 13.9 | 1.51 | | | | 2.58 | | |
| 6296-4 | 34.4 | 15.6 | 1.56 | | | | 5 | | |
| 6444-1 | 35.1 | 15.1 | 1.23 | | | | | 0.81 | |
| 6444-4 | 34.5 | 15.2 | 1.23 | | | | | 0.97 | |
| 6445-1 | 34.6 | 15.2 | 1.23 | | | | | 1.28 | |
| 6458-3 | 33.2 | 14.5 | 1.22 | | | | | | 0.42 |
| 6458-6 | 33.4 | 14.3 | 1.23 | | | | | | 0.58 |
| 7417-1 | 34.7 | 14.0 | 1.11 | | | 0.52 | | | |
| 7277-1 | 35.2 | 14.5 | 1.45 | | | | 0.61 | | |
| 7444-1 | 35.7 | 15.0 | 1.32 | | | | | 0.63 | |

What is claimed is:

1. Oxidized alumina-zirconia-silica (AZS) refractories containing 40 wt % to 55 wt % $Al_2O_3$, 32 wt % to 45 wt % $ZrO_2$, 10 wt % to less than 16 wt % $SiO_2$ and 1 wt % to 3 wt % of an alkali metal oxide selected from $Na_2O$, $K_2O$ and mixtures thereof, having a microstructure essentially comprising alpha-alumina crystals, free zirconia crystals, eutectic crystals and an intercrystalline vitreous phase, refractories wherein, at least in an active area thereof, more than 20% by number of said free zirconia crystals have a dendritic shape and are interleaved with each other and with eutectic crystals and at least 40% by number of said free zirconia crystals having a dendritic shape have a dimension greater than 300 μm.

2. The refractories claimed in claim 1 wherein a surface area of 64 mm² of said active area of said materials contains at least 200 of said free zirconia crystals having a dendritic shape have a dimension greater than 300 μm.

3. The refractories claimed in claim 1 containing 45 wt % to 50 wt % $Al_2O_3$, 34 wt % to 38 wt % $ZrO_2$, 12 wt % to 15 wt % $SiO_2$ and 1 wt % to 3 wt % of an alkali metal oxide selected from $Na_2O$, $K_2O$ and mixtures thereof.

4. The refractories claimed in claim 1 wherein more than 20% of said free zirconia crystals having a dendritic shape are longer than 500 μm.

5. The refractories claimed in claim 2 wherein a surface area of 64 mm² of said active area of said materials contains at least 100 of said free zirconia crystals having a dendritic shape have a dimension greater than 500 μm.

6. The refractories claimed in claim 1 further including at least one of the following optional oxides in the proportions indicated, and subject to the condition that the total of said oxides does not exceed 5%:

0.4–2.0% $B_2O_3$,
0.4–3.8% BaO,
0.4–5.0% $Cr_2O_3$,
0.4–1.3% $Li_2O$,
0.4–1.0% MgO.

* * * * *

UNITED STATES PATENT AND TRADEMARK OFFICE
CERTIFICATE OF CORRECTION

PATENT NO.    : 6,576,580 B2
DATED         : June 10, 2003
INVENTOR(S)   : Michel Marc Gaubil et al.

It is certified that error appears in the above-identified patent and that said Letters Patent is hereby corrected as shown below:

Column 10,
Line 47, change "have" to -- and having --.
Line 56, change "have" to -- and having --.

Signed and Sealed this

Thirtieth Day of September, 2003

JAMES E. ROGAN
*Director of the United States Patent and Trademark Office*